(12) United States Patent
Tuch et al.

(10) Patent No.: US 9,152,548 B2
(45) Date of Patent: Oct. 6, 2015

(54) CONTROLLING ACCESS TO A PRIVILEGED RESOURCE IN USER-MODE SYSTEM LEVEL MOBILE VIRTUALIZATION USING A PTRACE () SYSTEM CALL

(75) Inventors: Harvey Tuch, Cambridge, MA (US); Craig Newell, Cambridge, MA (US)

(73) Assignee: VMware, Inc., Palo Alto, CA (US)

(*) Notice: Subject to any disclaimer, the term of this patent is extended or adjusted under 35 U.S.C. 154(b) by 609 days.

(21) Appl. No.: 13/485,586

(22) Filed: May 31, 2012

(65) Prior Publication Data

US 2013/0185720 A1    Jul. 18, 2013

Related U.S. Application Data

(60) Provisional application No. 61/587,408, filed on Jan. 17, 2012.

(51) Int. Cl.
    *G06F 9/46*     (2006.01)
    *G06F 12/02*     (2006.01)

(52) U.S. Cl.
    CPC .................. *G06F 12/023* (2013.01)

(58) Field of Classification Search
None
See application file for complete search history.

(56) References Cited

U.S. PATENT DOCUMENTS

| | | | |
|---|---|---|---|
| 7,051,340 B2* | 5/2006 | Fisher et al. | 719/328 |
| 7,685,635 B2* | 3/2010 | Vega et al. | 726/17 |
| 7,853,958 B2* | 12/2010 | Mathew et al. | 719/318 |
| 8,230,399 B2* | 7/2012 | Vertes | 717/128 |
| 2010/0274987 A1* | 10/2010 | Subrahmanyam et al. | 711/207 |
| 2011/0246767 A1* | 10/2011 | Chaturvedi et al. | 713/164 |

* cited by examiner

*Primary Examiner* — Meng An
*Assistant Examiner* — Wissam Rashid (57) ABSTRACT

One embodiment of the present invention provides a system that facilitates user-mode system-level virtualization in a mobile device. During operation, a hypervisor intercepts a virtual machine's attempt to access a privileged resource. The hypervisor manages the virtual machine and runs on a host system in a user mode. Furthermore, the hypervisor emulates the privileged resource using a user-mode system call provided by the host system. In addition, the hypervisor provides access to the emulated privileged resource to the virtual machine, thereby allowing the virtual machine to operate with the emulated privileged resource without directly accessing actual privileged resources on the host system.

21 Claims, 6 Drawing Sheets

FIG. 6

CONTROLLING ACCESS TO A PRIVILEGED RESOURCE IN USER-MODE SYSTEM LEVEL MOBILE VIRTUALIZATION USING A PTRACE () SYSTEM CALL This application claims the benefit of U.S. Provisional Application No. 61/587,408, entitled "Mobile Virtual Appliances with a User-Mode Monitor," by inventors Harvey Tuch and Craig Newell, filed 17 Jan. 2012.

BACKGROUND

Over the past decade the mobile phone has evolved from a voice-centric device into a mobile personal computer. No longer just for telephony, the mobile phone has become a multitasking tool, useful for activities such as emailing and web browsing. The current trends for mobile phones are toward the mimicking of desktop functionality. As a result, mobile devices are becoming enterprise endpoints with rich applications and core enterprise connectivity. Because an enterprise may need to specifically provision a mobile device for accessing restricted data, an employee may either have to sacrifice a personal device or carry two devices, one personal and one enterprise, to work.

From an end-user perspective, it is desirable to consolidate a personal mobile device with an enterprise device. Virtualization offers an opportunity to provide a convenient solution by preserving isolation of environments without requiring a second physical enterprise device. Co-existing virtual phones on a personal mobile phone represents a very attractive alternative to existing solutions involving multiple physical mobile phones. The rapid pace of hardware advances in mobile devices over the past several years has led to a class of mobile phones with resources capable of supporting multiple virtual phones where the virtualization overhead is small.

Virtualization on a mobile device, however, presents its own challenges. On a conventional computer, a virtual machine monitor (VMM, also called a hypervisor) typically has access to privileged resources on the host machine, which are otherwise not available to an application running in user mode. On a mobile device, such privileges are typically not available to the user. When provisioning mobile devices with a traditional hypervisor, the developer often has to partner with carriers and original equipment manufacturers (OEMs), so that the hypervisor can be tightly coupled to the underlying host device and gain access to privileged resources. Such requirements increase the developer's time to market and limits its market coverage to specific phone models and carrier networks.

SUMMARY

One embodiment of the present invention provides a system that facilitates user-mode system-level virtualization in a mobile device. During operation, a hypervisor intercepts a virtual machine's attempt to access a privileged resource. The hypervisor manages the virtual machine and runs on a host system in a user mode. Furthermore, the hypervisor emulates the privileged resources using a user-mode system call provided by the host system. In addition, the hypervisor provides access to the emulated privileged resources to the virtual machine, thereby allowing the virtual machine to operate with the emulated privileged resources without directly accessing actual privileged resources on the host system.

In a variation of this embodiment, the hypervisor makes a system call on the host system to monitor the virtual machine's kernel and user processes.

In a further variation, the system call is a "ptrace" system call.

In a variation of this embodiment, the hypervisor maps a file to one or more locations in the virtual machine's address space, wherein the file can be a file on the host's file system or a shared memory file which is not present on the file system but a memory object visible to a user process as a file.

In a further variation, the hypervisor makes an "mmap" system call on the host system.

In a variation of this embodiment, the hypervisor maintains a plurality of shadow processes for the virtual machine, wherein a respective shadow process is associated with a tag which includes a particular page table base address.

In a further variation, the hypervisor switches to the shadow process corresponding to the changed page table base address in response to the virtual machine changing the page table base address.

In a further variation, the hypervisor associates one of the shadow processes with a new page table base address to which the virtual machine changes, and which does not match any of the shadow process's current associated page table base address.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of running a virtual machine on a mobile device in user mode is solved by intercepting a guest process's request to access privileged resources and emulate such resources by the hypervisor, thereby allowing the virtual machine to run in user mode without directly accessing privileged resources on the host device. In particular, the hypervisor uses user-mode system calls available in the host kernel (such as ptrace( ) to monitor a guest process and intercepts signals generated by the guest process. Such signals reflect at user-level the exceptions generated by the guest process on the physical hardware. Then, the hypervisor can examine and modify the core image and registers of the guest process. This mechanism allows the hypervisor to emulate privileged instructions for the guest process and virtualize exceptions. In addition, the hypervisor uses this intercepting mechanism to map a guest address space to a physical memory file, thereby achieving memory virtualization without directly accessing the memory management unit on the host device.

Although the present disclosure is presented using examples of mobile phones, embodiments of the present invention are not limited to mobile devices and are applicable to any type of computing device, including but not limited to, desktop computers, notebook computers, netbook computers, tablets, portable multimedia players, etc.

User-Mode Mobile Virtualization Platform

In today's mobile market, mobile software distribution is increasingly shifting towards an application store model, where a user can download and install third party software after purchasing a mobile device. Embodiments of the present invention provide a user-mode mobile virtualization platform (UMVP) which allows a hypervisor process to run as a regular user-mode process on a host kernel. This technology allows a user to download and install the hypervisor, guest kernels, and guest user applications on a mobile device like any other third-party application, without having to gain direct access to privileged resources on the host. In this regard, UMVP is significantly different from a conventional mobile virtualization platform (MVP) which directly accesses privileged resources, as described in "The VMware mobile virtualization platform: is that a hypervisor in your pocket?" Ken Barr et al., ACM SIGOPS Operating Systems Review, Volume 44 Issue 4, December 2010, pages 124-135.

Figure 1:
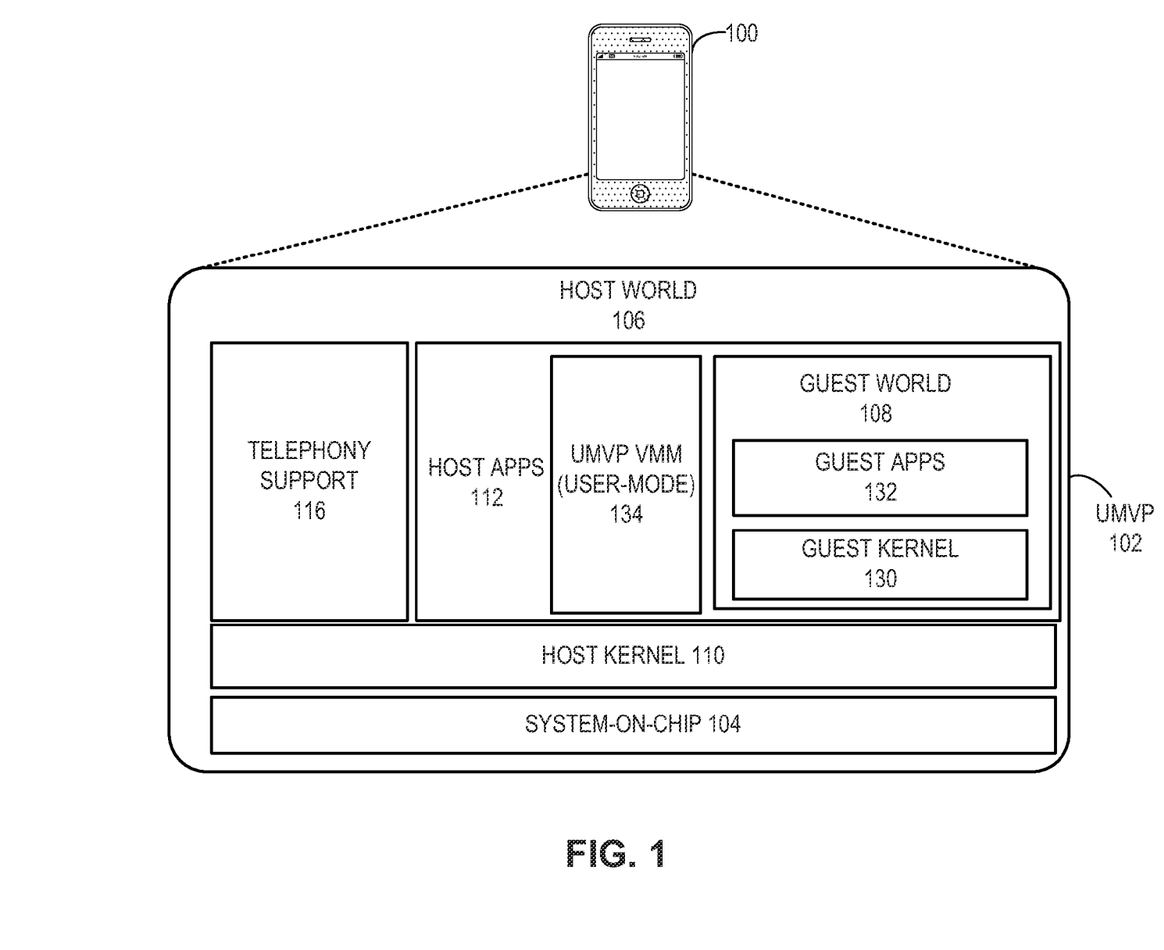
FIG. 1 illustrates an exemplary system architecture for a user-mode mobile virtualization platform in accordance with an embodiment of the present invention.

FIG. 1 illustrates an exemplary system architecture for a user-mode mobile virtualization platform in accordance with an embodiment of the present invention. A physical mobile phone 100 in FIG. 1 includes UMVP 102, which typically resides in a system-on-chip (SoC) 104. The native operating system on phone 100 runs host kernel 110 over SoC 104. Host user-mode applications 112 run on host kernel 110 and can include personal applications of the owner of phone 100. A UMVP virtual machine monitor (hypervisor) 134 also runs on host kernel 110 as a user-mode application. Telephony support 116 allows phone 100 to make regular telephone calls. Host kernel 110 and all modules running on host kernel 110 form a "host world" 106. Host world 106 includes the user and system context, such as user files, privileged register files, and processor states.

In some embodiments, UMVP 102 can run a guest operating system for a virtual mobile phone above the native operating system. The guest operating system includes a guest kernel 130 which runs guest applications 132. Guest kernel 130 and all modules running on guest kernel 130 form a "guest world" 108. Note that the entire guest world 108, including guest kernel 130 and guest applications 132, runs as part of the host user applications and hence is within host world 106.

In conventional MVP implementations, the MVP relies on the ability of certain components to operate in privileged mode in the native operating system. For example, a daemon process called MVP daemon (MVPD) can execute as a privileged user on the host and is responsible for granting necessary capabilities to MVP-related processes. In some embodiments, an OEM places the MVPD on the mobile device. In contrast, UMVP does not require such components to operate in privileged mode for the VMM, guest kernel, and guest applications to function on the mobile device.

Figure 2:
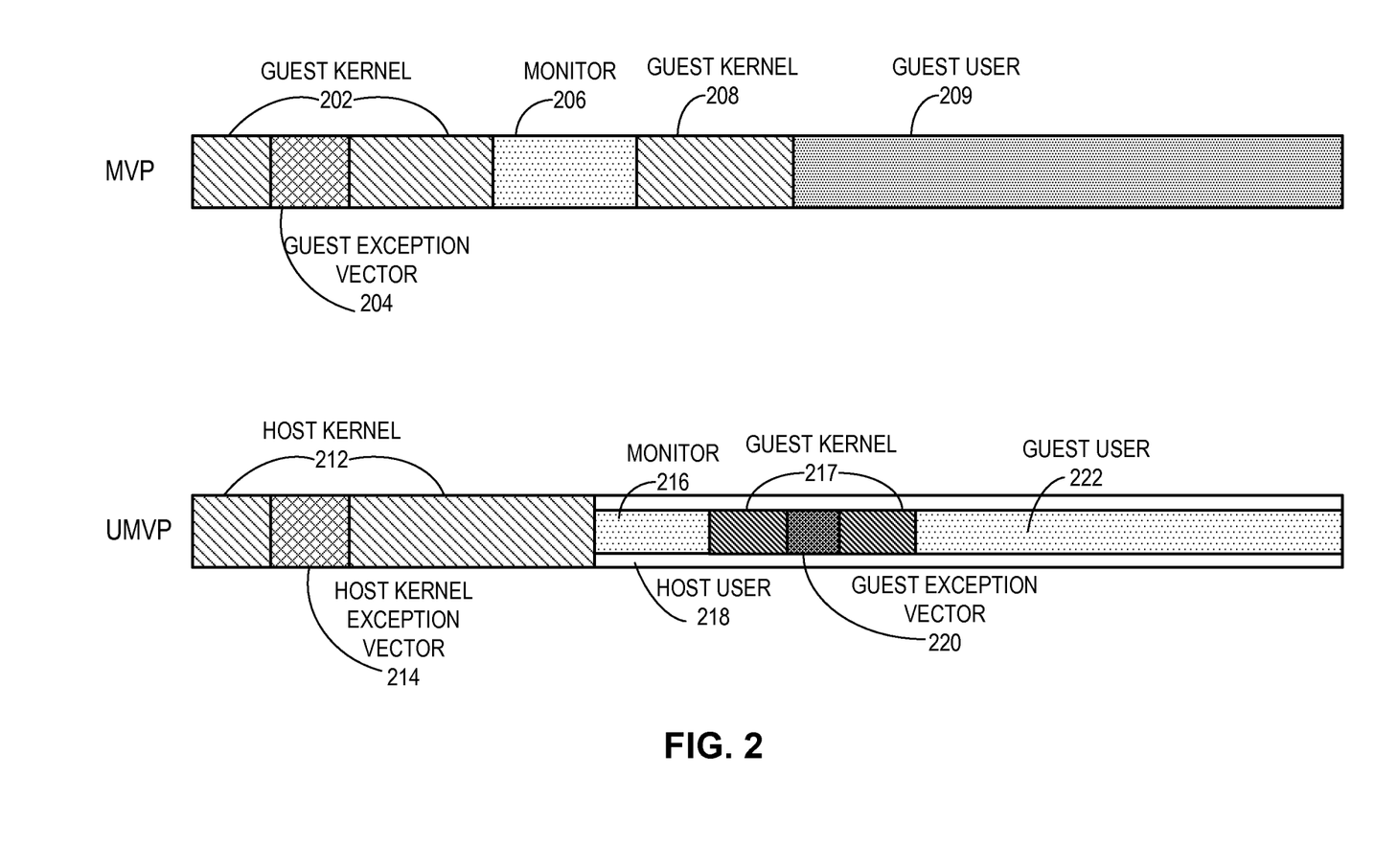
FIG. 2 illustrates the difference between memory configurations of a conventional privileged-mode MVP and UMVP, in accordance with one embodiment of the present invention.

In terms of memory usage, with UMVP, the VMM, guest kernel and guest user applications all reside in the host's user address space, whereas with conventional MVP the VMM, guest kernel, and guest user applications reside in an address space that is separate from the host user address space. FIG. 2 illustrates the difference between memory configurations of a conventional privileged-mode MVP and UMVP, in accordance with one embodiment of the present invention. In the case of conventional privileged-mode MVP, a guest kernel 202, a guest exception vector 204, a VMM 206, and guest user space 209 all reside in an address space which is separate from any host user address space. In the case of UMVP, a host kernel 212, host exception vector 214, and a host user space 218 constitute the host's address space. A VMM 216, guest kernel 217, guest exception vector 220, and guest address space 222 all reside within the host user space 218.

UMVP Implementation

In general, UMVP provides three types of virtualizations: instruction set virtualization, device virtualization, and memory virtualization. When devices are memory mapped, device virtualization is a special case of memory virtualization. Hence, the description below mainly focuses on instruction set virtualization and memory virtualization.

Instruction Set Virtualization

The main goal of instruction set virtualization is to allow a privileged-mode instruction of a guest process to execute with the impression that it is accessing privileged resources, without using a privileged-mode system call on the host kernel. One way to achieve this effect is to use a user-mode debugging system call provided by the host kernel to monitor the execution state of the guest process, perform the guest instruction operation, and modify the guest register values, thereby emulating the privileged-mode instruction. In one embodiment, the hypervisor process, which is a user-mode process running above the host kernel, spawns a child process. The child process then uses the ptrace( ) system call (from the host kernel) to initiate tracing of itself, and initiates the guest kernel process from within itself. The ptrace( ) system call provides a means by which a parent process may observe and control the execution of another process, and examine and change its core image and registers. ptrace( ) is primarily used to implement breakpoint debugging and system call tracing.

While being traced, the child process (i.e., the guest process) will stop each time it raises a signal. The parent process will be notified at its next wait( ) system call and may inspect and modify the child process while it is stopped. The parent then causes the child to continue, optionally ignoring the delivered signal (or even delivering a different signal instead).

Figure 3:
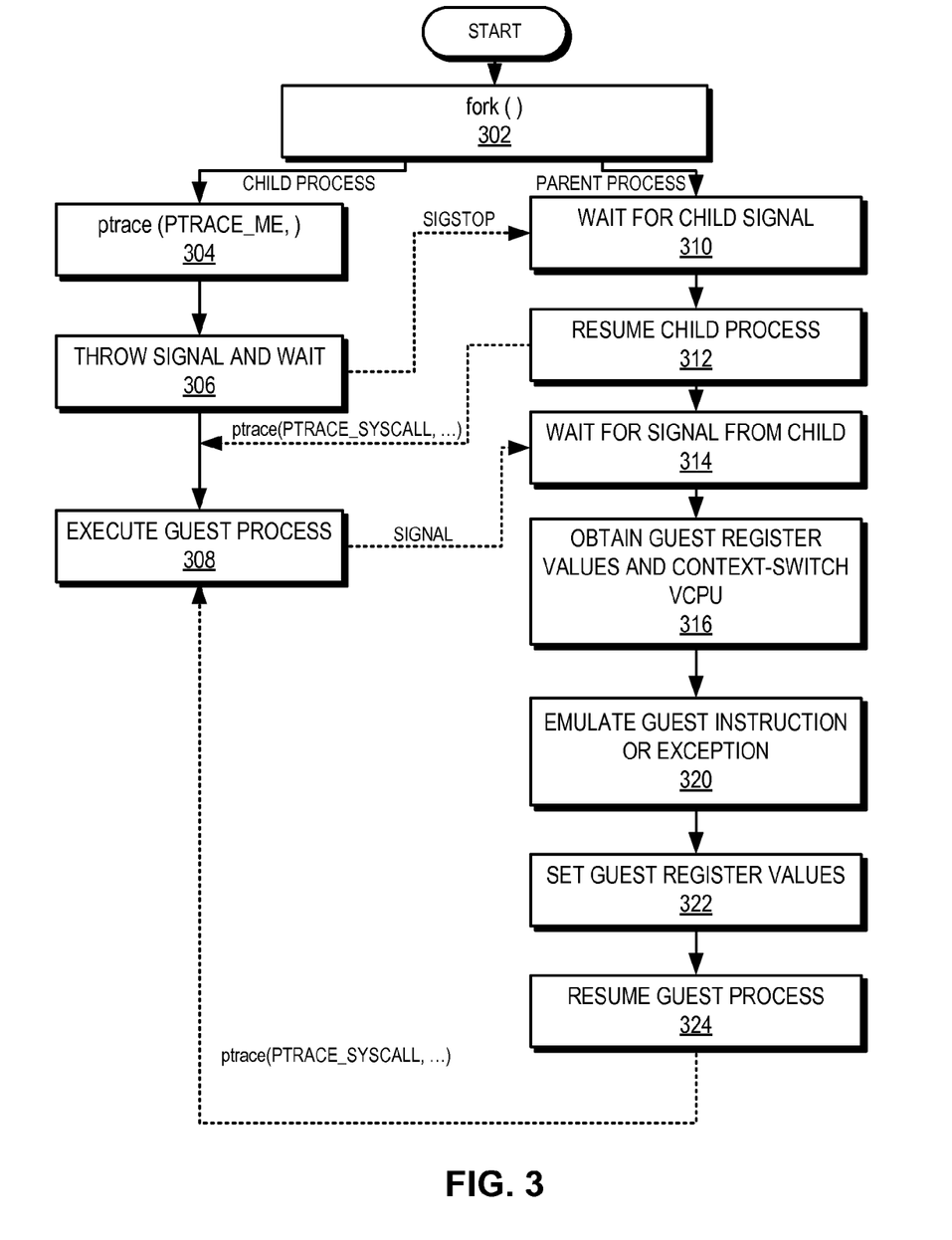
FIG. 3 presents a flow chart illustrating the operation of tracing a guest process, in accordance with one embodiment of the present invention.

FIG. 3 presents a flow chart illustrating the operation of tracing a guest process, in accordance with one embodiment of the present invention. During operation, a hypervisor executing as a host user process first forks itself to create a child process (operation 302). The forked child process then makes a ptrace( ) system call to trace itself (operation 304). Subsequently, the child process throws a SIGSTOP signal (operation 306). Since any signal delivered by a traced process causes the process to stop, this SIGSTOP signal causes the child process to stop and wait. Meanwhile, the parent (hypervisor) process waits for a signal from the child (operation 310). After receiving the SIGSTOP signal from the child, the parent instructs the child to resume execution by issuing a ptrace(PTRACE_SYSCALL, . . . ) command (operation 312) and waits for the next signal from the child (operation 314). Note that operations 304, 306, 310, and 312 allow the child process and parent process to synchronize with each other before the guest process starts.

Subsequently, the child process executes the guest process (which in turn executes both guest user and kernel code at various times) (operation 308). Note that every time the guest process raises a signal, analogous to raising a hardware exception, the child process stops and waits for the parent process to take proper actions. Suppose that during execution the guest process throws a signal, which ptrace( ) passes to the parent process. In response, the parent process obtains the state of the guest process, including all the register values, and uses this state information to context-switch the virtual CPU (operation 316). In one embodiment, the parent process does this by making a ptrace(PTRACE_GETREGS, . . . ) call. The parent process then emulates the instruction or exception handling implied by the signal (operation 320).

Next, the parent process loads the VCPU register state back into the guest process in preparation for resuming the guest thread (operation 322). The parent then resumes the guest kernel process by calling ptrace(PTRACE_SYSCALL, . . . ) (operation 324).

Memory Virtualization

With UMVP, the virtualized guest operating system has the view that it has access to a set of physical memory and an MMU, similar to that of real hardware. In one embodiment, the hypervisor uses the mmap/munmap/mprotect family of system calls to facilitate this view. When the guest initially starts, the hypervisor ensures that the guest's process address space is empty, analogous to a hardware boot where the translation lookaside buffer (TLB) contains no entries. The hypervisor can achieve this effect by performing an munmap( ) on the defined guest region of the address space. Note that the hypervisor can only issue mmap/munmap/mprotect calls for the current process address space. The hypervisor is able to control the guest address space because it either shares the same address space as the guest, or because it has the ability to change guest control flow and has some shared code pages.

In the scenario where the hypervisor and guest share the same address space, the hypervisor and guest threads share the same process. The hypervisor thread is still the ptrace parent of the guest thread(s), and is able to intercept guest thread page faults (reflected as SIGSEGV signals). Because the hypervisor thread shares the same process address space as the guest address space, it can issue the mmap/munmap/mprotect calls directly to the host kernel.

In the scenario where the hypervisor resides in a separate process from the guest thread(s), the hypervisor can queue up a set of mmap/munmap/mprotect calls, and when next re-entering the guest via a ptrace(PTRACE_SYSCALL . . . ) call, it can first setup the guest thread with ptrace(PTRACE_SETREGS . . . ) to resume execution not at the intended guest location, but at some stub code in the guest process that is able to read from the mmap/munmap/mprotect call queue, and invoke the system calls against the kernel. Once finished processing, the stub then jumps to the intended guest resumption point. This approach protects the hypervisor code against the guest, but still requires some violation of the memory virtualization abstraction, since there needs to be a stub code page and shared queue page mapped into the guest process.

The hypervisor can represent the guest physical memory as either a real file on the host file system (e.g. a 128 MB file representing 128 MB of virtualized physical memory) or as a shared memory file that is not present on the file system but a large memory object visible to a user process as a file via a virtual file system layer. In either case, the file is created in the hypervisor thread/process at initialization. The hypervisor can then map and unmap the file at one or more locations in the guest process address space by calling mmap( ). Since the guest threads are children of the hypervisor parent, they inherit the file descriptor for the physical memory file and can supply it as a parameter to the mmap( ) call.

When the guest first begins to execute in its empty address space, the guest kernel will immediately raise a page fault signal (e.g., a SIGSEGV signal). This is because the code pointed to by the initial program counter is not mapped to the memory file. The hypervisor thread will process this signal. At this point, the guest's virtual MMU is in the disabled state, and hence there is no need to consult any guest page table. Furthermore, virtual addresses are mapped 1:1 to physical addresses and there is no permission check required. Hence, if the guest beings execution at 0x1000, the page at 0x1000 offset in the physical memory file will be mapped into the guest process at 0x1000.

Later, the guest enables its virtual MMU and points its virtual translation table base register (TTBR) at a page table. When a page fault occurs, the hypervisor traverses the guest page table structure via the physical memory file to determine the guest's intended virtual-to-physical mapping and the page protection status. For example, the guest's page table may state that 0x8000 should map to 0x270000. The hypervisor then calls mmap to resolve the page fault and maps 0x8000 to offset 0x270000 in the physical memory file. In addition, the hypervisor can implement read/write/no-execute page protection by mapping into the guest with the appropriate PROT_READ/PROT_WRITE/PROT_EXEC value when calling mmap. To distinguish a guest user mapping from the guest kernel mapping, the hypervisor can unmap the guest kernel mappings completely during guest user execution. If the mapping in the guest page table is invalid or if the hypervisor detects a page protection violation while traversing the guest page table, the hypervisor injects a memory abort exception into the guest by jumping to the guest kernel's abort entry in its exception vector and updating the guest register file.

Guest TLB maintenance operations, such as invalidate-by-virtual-address or invalidate-by-address-space-identifier, generate signals (SIGILL), since they are privileged instructions. The hypervisor can emulate these invalidation by issuing corresponding munmap( ) system calls to cover the affected region of the address space.

Figure 4:
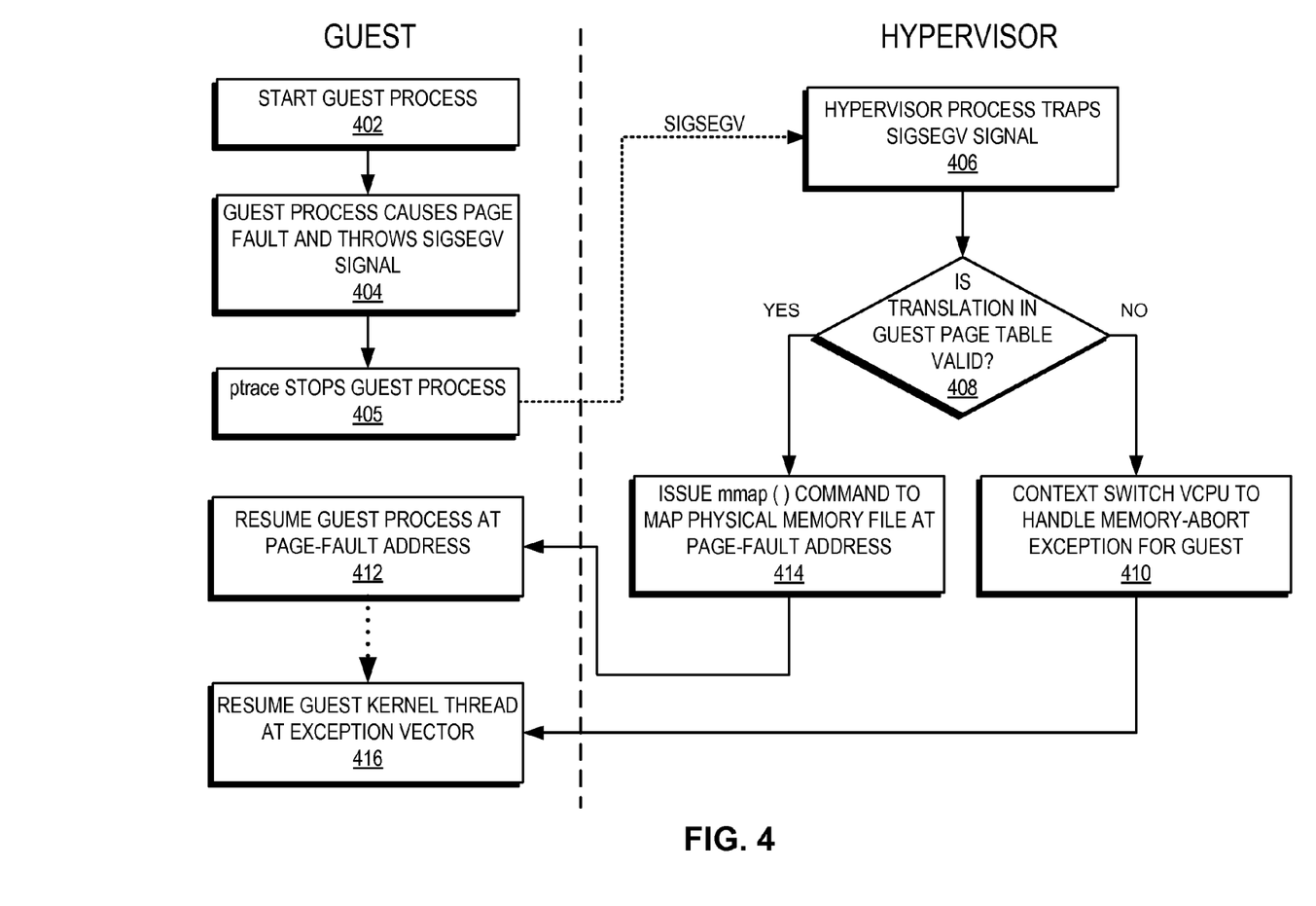
FIG. 4 presents a flow chart illustrating an exemplary process of memory virtualization in UMVP, in accordance with one embodiment of the present invention.

FIG. 4 presents a flow chart illustrating an exemplary process of memory virtualization in UMVP, in accordance with one embodiment of the present invention. Initially, a new guest process (which can involve a guest kernel process, guest user process, or both) starts on the guest (operation 402). Since the hypervisor has not mapped the guest address space corresponding to this guest process to the memory file, the guest process causes a page fault and throws a SIGSEGV signal (operation 404). Subsequently, ptrace stops the guest process and delivers the SIGSEGV signal to the hypervisor (operation 405).

In response, the hypervisor process traps the SIGSEGV signal (operation 406). The hypervisor then determines whether the translation in the guest page table is valid (operation 408). If the translation is valid, the hypervisor issues an mmap( ) command to map the physical memory file to the guest address space at the page-fault address (operation 414). If the translation is invalid, the hypervisor context switches the virtual CPU to handle a memory-abort exception for the guest (operation 410), and returns the control to the guest kernel thread at the appropriate exception vector for a memory abort after updating its register file with the corresponding exception/fault information (operation 416).

In some scenarios, the above approach may cause significant system overhead when multiple guest user processes are present and share the virtual CPU. In particular, when the guest changes its TTBR, e.g., the guest kernel changes the current guest user process, the hypervisor typically has to unmap the entire guest address space, because the previous mappings may not be valid with the new guest address space. In order for the new guest page table to be mapped to the physical memory file, the hypervisor needs to repeat the same process as described in FIG. 4. When the guest switches back to the old TTBR, the same operations occur. Hence, the guest generates a large number of SIGSEGV signals which cause a significant context switching overhead.

To mitigate this overhead, UMVP can adopt a more sophisticated solution. Instead of a single guest process, the hypervisor can maintain multiple guest processes (referred to as shadow processes). Each shadow process represents exactly one guest address space, uniquely identified by the associated virtual TTBR value. For example, assume that there are three such processes, process A (TTBR 1), B (TTBR 2) and C (TTBR 3). When the guest switches to TTBR 2, the hypervisor transfers control to process B, and similarly for TTBR 3, process C. When the guest switches to a new TTBR value, say TTBR 4, the hypervisor can unmap all the entries associated with a victim guest user process (chosen with a given policy, e.g., least-recently-used), say process B, mark the new mapping as associated with TTBR 4, and transition control to this new guest user process. In this way, a pool of shadow processes reduces the frequency at which entire address space invalidations need to take place. The hypervisor can configure the number of shadow guest processes to match the guest's working set of distinct TTBR values.

Figure 5:
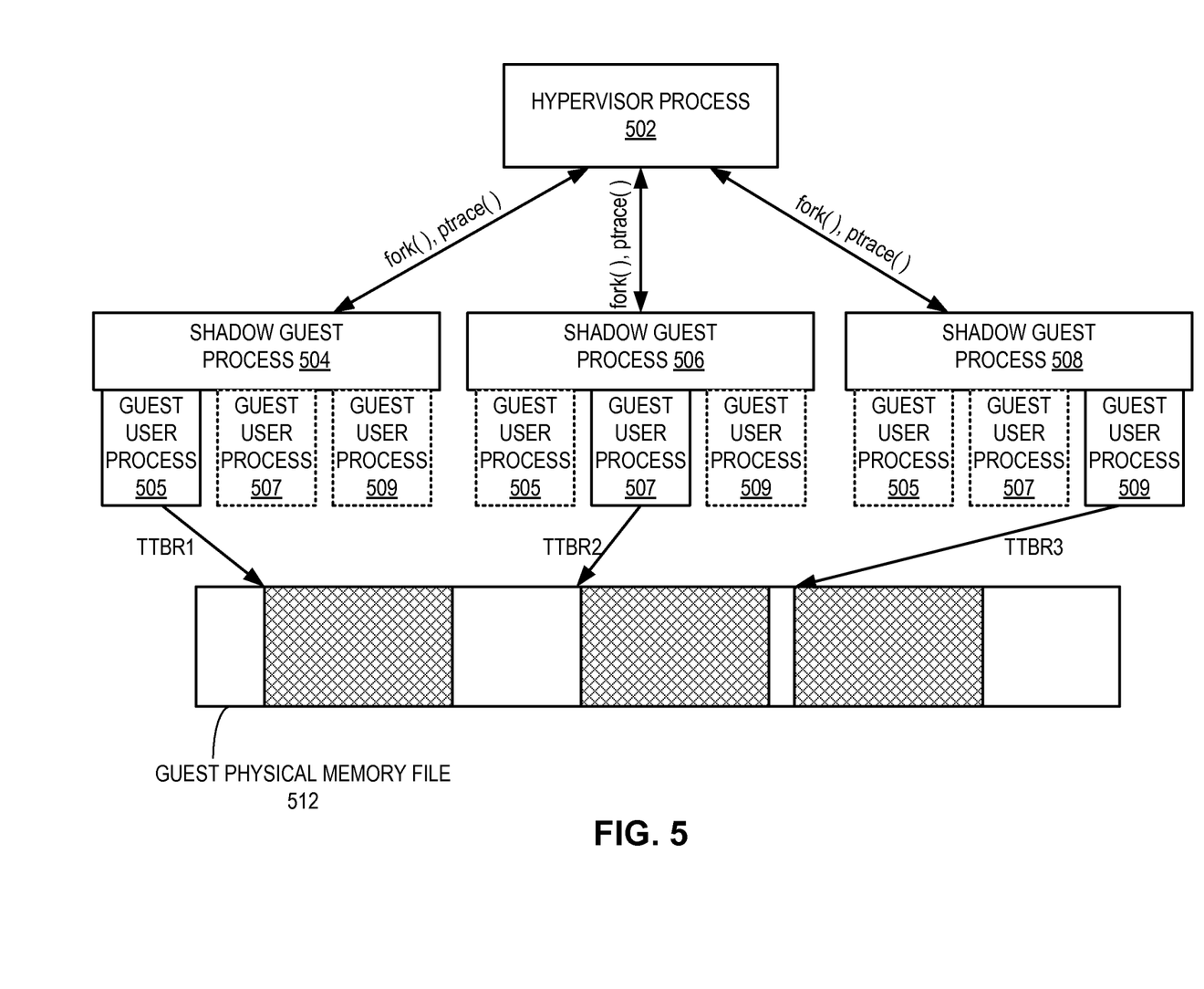
FIG. 5 illustrates an exemplary UMVP that facilitates shadow guest processes, in accordance with one embodiment of the present invention.

FIG. 5 illustrates an exemplary UMVP that facilitates shadow guest processes, in accordance with one embodiment of the present invention. In this example, a hypervisor process 502 uses fork( ) and ptrace( ) to generate three shadow guest processes 504, 506, and 508. Guest user processes 505, 507, and 509 each have their own TTBR, namely, TTBR1, TTBR2, and TTBR3. Correspondingly, the hypervisor maps each respective address space to a corresponding set of locations in a guest physical memory file 512. Furthermore, each shadow guest process is associated with a particular TTBR value. Specifically, shadow guest process 504 is associated with TTBR1, shadow guest process 506 is associated with TTBR2, and shadow guest process 508 is associated with TTBR3. When a respective guest kernel process switches from one guest user process to another guest user process, the guest kernel will change the TTBR value accordingly. In response, the hypervisor switches to the appropriate shadow guest process associated with the new TTBR. For example, assume that currently shadow guess process 504 is running guest user process 505, which is associated with TTBR1. Next, say the guest needs to switch to guest user process 507, which is associated with TTBR2. Instead of unmapping all the mappings associated with TTBR1 and later re-mapping with TTBR2, hypervisor 502 switches the control to shadow guest process 506, which is associated with TTBR2. This way, hypervisor 502 can avoid the overhead associated with frequent mapping and unmapping.

This technique can further mitigate the guest kernel-user transition costs. Recall that a guest kernel-to-user transition would require unmapping all the guest kernel entries in the guest page table. To attain this saving, each shadow process is tagged with not just the TTBR value, but also by whether it corresponds to guest user or guest kernel execution. When transitioning between guest kernel and user, the hypervisor can find a process that matches both the current virtual TTBR and the intended guest mode.

It is important to note that the techniques described above differ from other similar approaches like user-mode Linux, because UMVP does not require significant modification of extant guest kernel code. In addition, it is the hypervisor that initiates the mmap( ) calls, whereas in user-mode Linux it is the guest kernel that calls the mmap( ) function.

System Architecture

Figure 6:
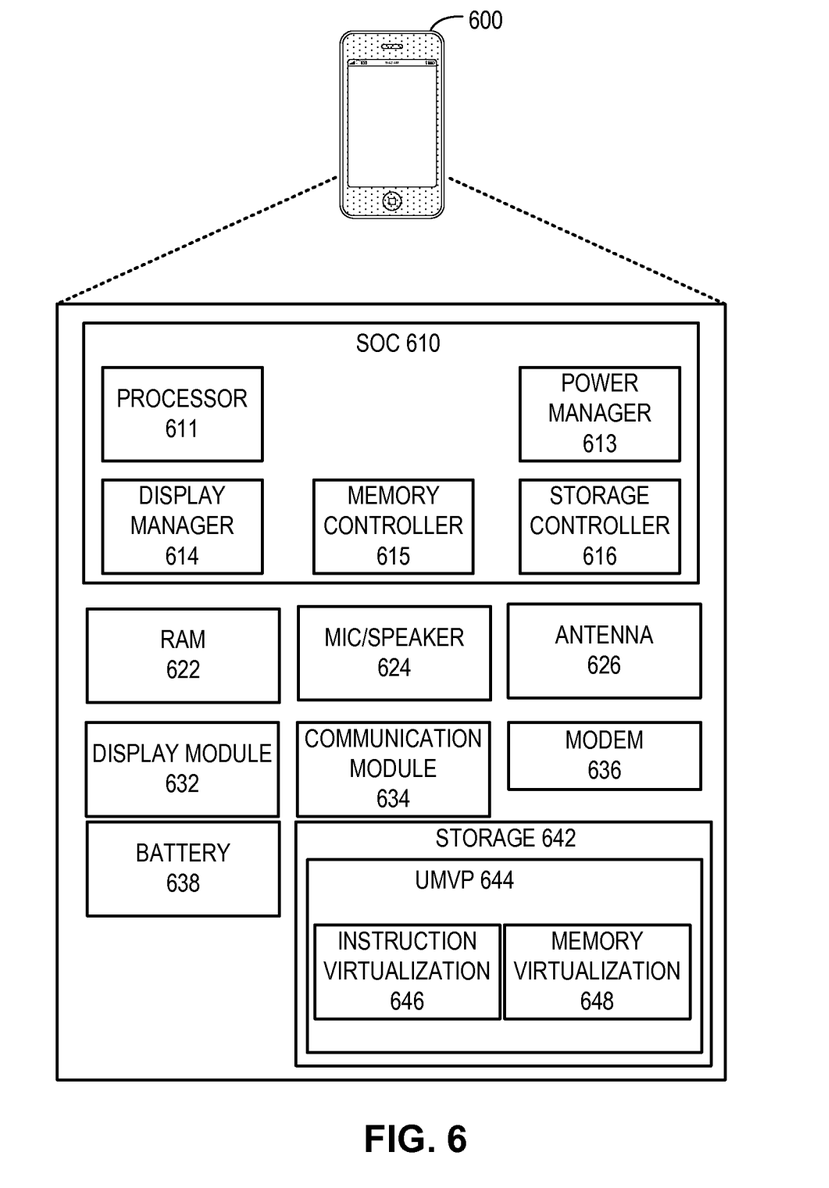
FIG. 6 illustrates an exemplary architecture of a UMVP system, in accordance with an embodiment of the present invention.

FIG. 6 illustrates an exemplary architecture of a UMVP system, in accordance with an embodiment of the present invention. Mobile device 600 includes a SoC 610 that provides the basic functionality to the system. In some embodiments, system 600 is a mobile phone. SoC 610 includes a processor 611 that executes the operations of system 600. Power manager 613 controls battery 638. Display manager 614 controls display module 632 and provides display to a user. In some embodiments, display module includes a liquid crystal display (LCD). Memory controller 615 allows processor 611 to access random access memory (RAM) 622. Storage controller 616 provides accesses to the flash storage device of system 600.

Microphone/speaker module 624 allows a user to perform regular voice operations. Communication module 624 uses antenna 626 and modem 636 to connect to a telephone network. System 600 includes storage 642. Storage 642 stores instructions which when executed by processor 611 implement a UMVP 644. In addition, UMVP 644 includes an instruction set virtualization module 646 and a memory virtualization module 648.

Note that the above-mentioned modules can be implemented in hardware as well as in software. In some embodiments, one or more of these modules can be embodied in computer-executable instructions stored in a memory which is coupled to one or more processors in system 600. When executed, these instructions cause the processor(s) to perform the aforementioned functions.

In summary, embodiments of the present invention provide a system and a method for facilitate user-mode system-level virtualization in a mobile device. In one embodiment, during operation, a hypervisor executes as a user-mode process on the host. The hypervisor intercepts a virtual machine's attempt to access a privileged resource, and emulates such privileged resource without directly accessing such a resource on the host.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method of controlling access by a virtual machine to a privileged resource on a host system, the method comprising:
configuring a hypervisor, wherein the hypervisor is managing the virtual machine and the hypervisor is executing as a user-mode process on the host system, by:
forking the user-mode process to create a child process;
invoking a user-mode system call to the host system to have the user-mode process intercept signals generated by the child process, wherein the user-mode system call is a ptrace ( ) system call; and
executing a guest process of the virtual machine from within the child process;
intercepting, by the hypervisor, the virtual machine's attempt to access the privileged resource by receiving a signal at the user-mode process, raised by the guest process of the virtual machine from the child process in response to the ptrace ( ) system call;
emulating the privileged resource at the user-mode process; and
providing access to the emulated privileged resource to the guest process of the virtual machine, thereby allowing the virtual machine to operate with the emulated privileged resource without directly accessing actual privileged resources on the host system.

2. The method of claim 1, wherein the guest process comprises the virtual machine's kernel process and user processes.

3. The method of claim 1, wherein the user-mode process is configured to intercept a segmentation fault signal raised by the guest process and received from the child process, wherein the privileged resource comprises a memory resource, and wherein the step of emulating the privileged resource comprises:
mapping a file to one or more locations in the virtual machine's address space, wherein the file can be a file on a file system or a shared memory file comprising a memory object visible to a user process as a file.

4. The method of claim 3, wherein mapping the file to the virtual machine's address space comprises making, by the hypervisor, an "mmap" system call on the host system.

5. The method of claim 1, further comprising:
maintaining a plurality of shadow processes for the virtual machine, wherein a respective shadow process is associated with a tag which includes a particular page table base address.

6. The method of claim 5, further comprising:
in response to the virtual machine changing the page table base address, switching to the shadow process corresponding to the changed page table base address.

7. The method of claim 5, further comprising:
associating one of the shadow processes with a new page table base address to which the virtual machine changes, and which does not match any of the shadow process's current associated page table base address.

8. A computer readable non-transitory storage medium storing instructions which when executed by a computer cause the computer to perform a method of controlling access by a virtual machine to a privileged resource on a host system, the method comprising:
configuring a hypervisor, wherein the hypervisor is managing the virtual machine and the hypervisor is executing as a user-mode process on the host system, by:
forking the user-mode process to create a child process;
invoking a user-mode system call to the host system to have the user-mode process intercept signals generated by the child process, wherein the user-mode system call is a ptrace ( ) system call; and
executing a guest process of the virtual machine from within the child process;
intercepting, by the hypervisor, the virtual machine's attempt to access the privileged resource by receiving a signal at the user-mode process, raised by the guest process of the virtual machine from the child process in response to the ptrace ( ) system call;
emulating the privileged resource at the user-mode process; and
providing access to the emulated privileged resource to the guest process of the virtual machine, thereby allowing the virtual machine to operate with the emulated privileged resource without directly accessing actual privileged resources on the host system.

9. The computer readable non-transitory storage medium of claim 8, wherein the guest process comprises the virtual machine's kernel and user processes.

10. The computer readable non-transitory storage medium of claim 8, wherein the user-mode process is configured to intercept a segmentation fault signal raised by the guest process and received from the child process, wherein the privileged resource comprises a memory resource, and wherein the step of emulating the privileged resource comprises:
mapping a file to one or more locations in the virtual machine's address space, wherein the file can be a file on a file system or a shared memory file comprising a memory object visible to a user process as a file.

11. The computer readable non-transitory storage medium of claim 10, wherein mapping the file to the virtual machine's address space comprises making, by the hypervisor, an "mmap" system call on the host system.

12. The computer readable non-transitory storage medium of claim 8, wherein the method further comprises:
maintaining a plurality of shadow processes for the virtual machine, wherein a respective shadow process is associated with a tag which includes a particular page table base address.

13. The computer readable non-transitory storage medium of claim 12, wherein the method further comprises:
in response to the virtual machine changing the page table base address, switching to the shadow process corresponding to the changed page table base address.

14. The computer readable non-transitory storage medium of claim 12, wherein the method further comprises:
associating one of the shadow processes with a new page table base address to which the virtual machine changes, and which does not match any of the shadow process's current associated page table base address.

15. A mobile computing system, comprising:
a processor configured to execute a host kernel;
a privileged resource managed by the host kernel; and
a hypervisor managing a virtual machine and the hypervisor configured to execute as a user-mode process on the processor within the host kernel, the hypervisor further configured to:
fork the user-mode process to create a child process;
invoke a user-mode system call to the host kernel to have the user-mode process intercept signals generated by the child process, wherein the user-mode system call is a ptrace ( ) system call; and
execute a guest process of a virtual machine from within the child process;
intercept, by the hypervisor, the virtual machine's attempt to access the privileged resource by receiving a signal at the user-mode process, raised by the guest process of the virtual machine from the child process in response to the ptrace ( ) system call;

emulate the privileged resource at the user-mode process; and provide access to the emulated privileged resource to the guest process of the virtual machine, thereby allowing the virtual machine to operate with the emulated privileged resource without directly accessing the privileged resource.

16. The mobile computing system of claim 15, wherein the guest process comprises the virtual machine's kernel and user processes.

17. The mobile computing system of claim 15, wherein the user-mode process is configured to intercept a segmentation fault signal raised by the guest process and received from the child process, wherein the privileged resource comprises a memory resource, and wherein hypervisor is configured to:

map a file to one or more locations in the virtual machine's address space, wherein the file can be a file on a file system or a shared memory file comprising a memory object visible to a user process as a file.

18. The mobile computing system of claim 17, wherein while mapping the file to the virtual machine's address space, the hypervisor is configured to make an "mmap" system call to the host kernel.

19. The mobile computing system of claim 15, wherein the hypervisor is configured to maintain a plurality of shadow processes for the virtual machine, wherein a respective shadow process is associated with a tag which includes a particular page table base address.

20. The mobile computing system of claim 19, wherein the hypervisor is further configured to switch to the shadow process corresponding to the changed page table base address in response to the virtual machine changing the page table base address.

21. The mobile computing system of claim 19, wherein the hypervisor is further configured to associate one of the shadow processes with a new page table base address to which the virtual machine changes, and which does not match any of the shadow process's current associated page table base address.

* * * * *